May 12, 1964     F. A. DE PUYDT ETAL     3,132,878
CHAIN LOCKING DEVICE
Filed July 11, 1962

INVENTORS
ROGER C. SILVER
BY   FRANK A. DE PUYDT

*Rudolph L. Lowell*

ATTORNEY

United States Patent Office 3,132,878
Patented May 12, 1964

3,132,878
CHAIN LOCKING DEVICE
Frank A. De Puydt and Roger C. Silver, Des Moines, Iowa, assignors to Dico Corporation, Des Moines, Iowa, a corporation of Iowa
Filed July 11, 1962, Ser. No. 209,069
4 Claims. (Cl. 280—457)

The present invention relates in general to chain locking or fastening devices and more particularly to a chain fastening unit designed to securely retain the ends of safety chains commonly used in conjunction with an automobile trailer hitch. The supplemental safety chain arrangement referred to usually comprises a pair of individual lengths of safety chain, both of which extend from a point on the trailer tongue or trailer portion of the hitch to a securing point on the vehicle frame or hitch bar. These individual lengths of chain are normally crossed and extend below the trailer hitch arrangement with some slack being provided to insure that no tension or load is placed on the safety chains under normal operation. In the event that the trailer hitch, usually of the well known ball and socket type, should break under the draft load or uncouple for any reason at all, the safety chains will serve to maintain the coupled relation between the vehicle and the trailer and also to prevent the tongue from falling to the ground or road surface. In some areas, the supplemental safety chain arrangement is required as a matter of law and hence the need for a safety chain fastening attachment, providing a simple and quick positive attachment for safety chains, is presented. The application of the safety chain linkage is not limited to automobile trailer arrangements, but also finds general utility in almost any type of articulated vehicle, thus the chain fastening device of the present invention is subject to a very wide application.

The invention thus has for its primary object the presentation of novel and useful improvements in the efficiency and effectiveness of chain fastening and locking devices.

Another object of the present invention is to provide a safety chain fastener which provides a positive but releasable attachment for link chains and yet is simple in construction and number of parts involved.

Yet another object of the present invention is to provide a completely separate chain fastening unit which may be attached to any conventional draw bar structure and may be readily and quickly removed for use on a different vehicle.

A further object of this invention is to provide a positive holding means for a link type chain wherein the connection between the chain and the chain fastening device is sufficiently strong to carry whatever load the chain is capable of bearing.

A further object of this invention is to provide a resilient safety holding or locking feature at the point of attachment between the safety chain and the chain fastening member to prevent any possibility of disconnection.

A still further object of the present invention is to provide a chain fastening device which will accommodate the attachment of the link chain at any point along its length.

The means by which the foregoing objects and other advantages, which will be apparent to those skilled in the art, are accomplished are set forth in the following specification and claims and are illustrated in the accompanying drawings dealing with the preferred embodiment. Reference is now made to the accompanying drawings in which:

Figure 1:
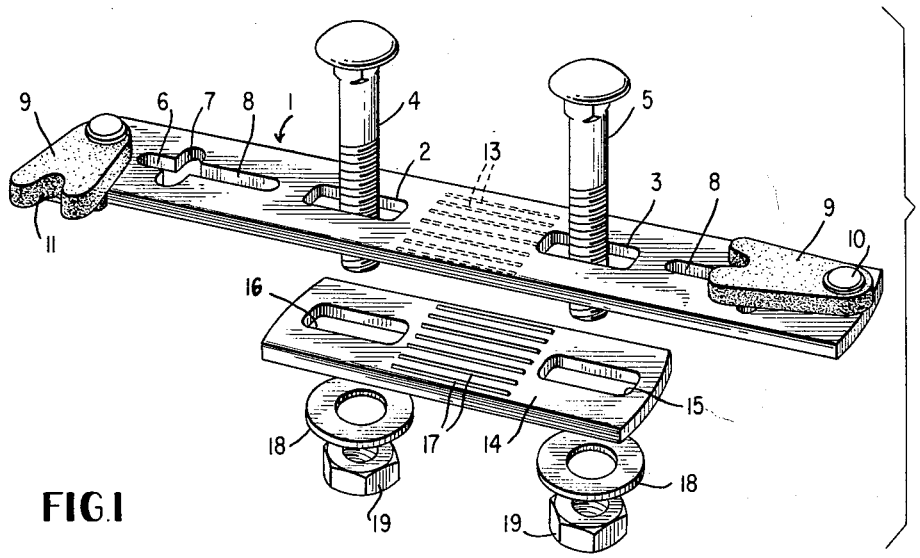
FIGURE 1 is an exploded view of the entire chain fastening device.

Referring now to the drawings, wherein like reference numerals are used to indicate identical parts in various views, the preferred embodiment of the invention comprises an upper main cross bar 1 having spaced elongated slots or openings 2 and 3 to accommodate attaching bolts 4 and 5 respectively. The manner of attaching the main cross bar 1 to the draw bar of a vehicle will be presently described. Adjacent both of the terminal ends of the main cross bar 1, identical cross shaped openings are provided which extend completely through the body of the bar 1. Each one of these openings comprises a longitudinally extending slot 6 and a relatively short transverse slot 7 which extends at right angles to the slot 6. As shown clearly in FIGURES 1 and 2, the transverse slot 7 intersects the longitudinal slot 6 at one side of the mid-point thereof toward the terminal ends of the bar 1, leaving the inwardly extending portion 8 of the slot 6 of a greater length than the remaining legs of the cross shaped slot. The length of the portion 8 of the cross shaped slot will be substantially that of the diameter of a link of the chain to be held by the bar 1.

Pivoted to each of the terminal end portions of the bar 1 at a point beyond the position of the cross shaped slots are flexible locking or retaining members 9 which are designed to cooperate with the cross shaped slot in holding the links of the safety chain in engagement with the cross bar 1. The resilient members 9 may be composed of rubber or any other suitable soft and pliable material. The members 9 are pivoted to the bar 1 by means of rivets 10 which pass through the bar 1 and provide the pivotal axis for the resilient members. The resilient members 9 are generally triangular in configuration and include a curved indentation 11 in one side thereof opposite the pivotal attachment. The bottom sides of the resilient members 9 include integral projections 12, as shown most clearly in FIGURE 4, which extend from the bottom face of the resilient members and which cooperate to maintain the resilient members in locking position when the projections 12 engage the cross slots 7 of the bar. The locked positions of the resilient members are shown clearly in FIGURE 2.

To complete the structure of the main cross bar 1, a serrated surface 13 is provided on the bottom face of the main cross bar in the area between the elongated slots 2 and 3 for the purpose for providing a higher degree of friction between the cross bar 1 and the draw bar of the vehicle to which it is to be attached. For the purpose of attaching the cross bar in position on the draw bar of the vehicle, a bottom cross bar 14, shown in FIGURE 1 is provided with elongated slots 15 and 16 which match the slots 2 and 3 of the main cross bar 1. The lower cross bar 14 is also provided with serrations 17 for the same purpose as the serrations 13. It will be noted that the lower cross bar 14 need not be as long as the cross bar 1, but need only be long enough to provide the requisite strength and to provide a surface for the slots 15 and 16. Washers 18 and nuts 19 are provided for cooperation with the bolts 4 and 5 in clamping the cross bars 1 and 14 to a draw bar of a vehicle in a well known manner.

Figures 2, 3, 4:
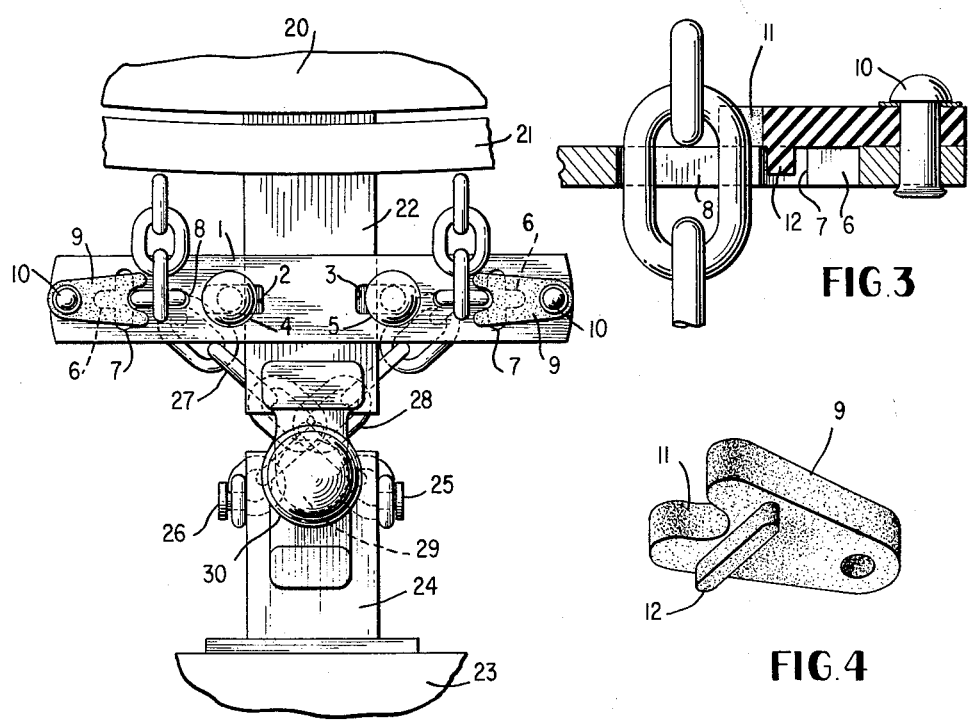
FIGURE 2 is a top plan view showing the chain fastening device mounted on the draw bar of a vehicle and secured to a pair of safety chains.
FIGURE 3 is a partially sectioned detail showing the engagement between the chain fastening device and the safety chain.
FIGURE 4 is a perspective view of the resilient holding member.

In FIGURE 2, the application of the present device in conjunction with a conventional trailer hitch and safety chain arrangement is illustrated. In this instance, the vehicle is shown at 20 and includes a bumper 21 as well as a draw bar 22 rigidly fixed to the vehicle frame. The trailer is indicated at 23 and includes a tongue 24. The tongue member 24 includes chain link attaching studs 25 and 26 to which are attached the safety chain members 27 and 28 respectively. A conventional ball and socket type trailer hitch is illustrated for coupling the draw bar 22 with the trailer tongue 24 and includes a ball 29 carried by the draw bar 22 and a socket member 30 carried by the trailer tongue. The details of the trailer hitch itself form no part of the present invention and any suitable trailer hitch may be utilized, as, for example, the ball and socket trailer hitch illustrated in the Lamberson Patent 3,009,714.

In the utilization of the present invention, the top and bottom cross bars 1 and 14 are first clamped to the draw bar of the particular vehicle to be utilized by means of the clamping bolts 4 and 5. The entire chain fastening assembly will be tightly clamped on to the draw bar with the serrated surfaces 13 and 17 enhancing the gripping action between the cross bars and the draw bar. Once the chain fastening device is securely attached to the draw bar, the trailer hitch is assembled with the socket member of the trailer tongue being securely fastened to the ball member of the draw bar according to the fashion of the particular hitch utilized. The resilient retaining members 9 are then flexed upwardly to disengage the projection 12 from the cross slots 7 and the resilient members are then pivoted outwardly away from the cross shaped slots as illustrated on the left side of the main cross bar 1 in FIGURE 1. At this point the safety chains 27 and 28 are crossed beneath the trailer hitch and the cross shaped configuration of the slots in the cross bar 1 enable the chains to be passed upwardly through the cross bar 1, link by link, in a well known fashion until the proper attaching point on the chains is reached. A selected link on each of the chains is then passed inwardly along the elongated portions 8 as shown in FIGURES 2 and 3. In this position, the two links adjacent the engaged link of each of the chains will maintain the engaged link in secured relationship with the cross bar 1. In order to insure continued attachment between the chains 27 and 28 and the cross bar 1, the resilient members 9 are then returned to their locking positions as illustrated in FIGURE 2 and serve to prevent the engaged links of the chains from moving outwardly along the slots and from thus disengaging the cross bar 1. As will be realized from an inspection of the drawings of the device and the description, the resilient retaining members 9 normally maintain none of the load which might be applied to the safety chains, but merely act to prevent the engaged links from moving to a position from which disengagement could occur.

It will thus be readily apparent to those skilled in the art that the present invention provides novel and useful improvements in safety chain fastening devices particularly and in chain fastening devices in general. The present invention will provide an efficient yet simple chain fastening construction finding utility in a multitude of applications. The arrangement and types of structural components utilized within the present invention may be subject to numerous modifications well within the purview of this invention and applicant intends only to be limited to a liberal interpretation of the specification and appended claims.

Having thus described the invention, what is claimed as new and desired to be secured by Letters Patent is:

1. A safety chain fastening device comprising; an elongated cross bar adapted to be clamped to the draw bar of a vehicle, a chain locking means on each terminal end of said cross bar, each of said chain locking means including an elongated slot extending longitudinally of said cross bar, a transversely extending slot in said cross bar intersecting said elongated slot at right angles thereto and to one side of the mid-point thereof, a resilient retaining member pivoted to said cross bar and overlying said transverse slot and a substantial portion of said elongated slot, and an integral projection on the face of said resilient member for engaging said transverse slot when said member is in overlying position on said slots, whereby a chain link which is passed through the intersecting portions of said slots may be moved along the uncovered portion of said elongated slot and retained there by said resilient member.

2. A chain locking device comprising, a flat bar, an elongated slot in said bar, a second slot intersecting said elongated slot at right angles and to one side of the mid-portion thereof, a flexible generally triangular flat member pivoted to said bar at a point adjacent the end of said elongated slot nearest said second slot, said flexible member including an integral projection engaging said second slot and a curved indent portion registering with said elongated slot, whereby said flexible member may be pivoted to a position covering said second slot and the portion of said elongated slot to said one side of the mid-portion thereof.

3. A safety chain fastening device comprising a cross bar, means to clamp said cross bar to the draw bar of a vehicle, a chain locking means adjacent each terminal end of said bar, each of said locking means including, a first slot extended longitudinally of said cross bar and a second slot normal to and intersecting said first slot to one side of the mid-point thereof, and resilient retaining means pivoted to said cross bar for selectively covering said second slot and the portion of said first slot intersected by said second slot, said resilient retaining means comprising a flexible member adapted to overlie said second slot, a projection on said flexible member for engaging said second slot when said flexible member is overlying said second slot, and a curved indented portion on said flexible member for engaging a portion of a chain and retaining the same within said first slot.

4. A chain locking device comprising bar means, a first slot in said bar means, a second slot in said bar means intersecting said first slot, and resilient retaining means pivoted to said bar means for selectively covering said second slot and the portion of said first slot intersected by said second slot, said resilient retaining means comprising a flexible member having at least one projection engageable with at least one of said slots when said flexible member is overlying said second slot, said projection coacting with said one of the slots to hold said flexible member in said overlying position.

References Cited in the file of this patent
UNITED STATES PATENTS

| 1,866,813 | Lindvall | July 12, 1932 |
|---|---|---|
| 2,196,115 | Jacobson | Apr. 2, 1940 |
| 2,529,686 | Green | Nov. 14, 1950 |
| 2,937,885 | Skow | May 24, 1960 |
| 2,965,392 | Mitchell et al. | Dec. 20, 1960 |
| 2,998,982 | Brazil | Sept. 5, 1961 |